United States Patent
Nguyen et al.

(10) Patent No.: US 9,325,158 B2
(45) Date of Patent: Apr. 26, 2016

(54) ELECTRICAL ENCLOSURE INCLUDING AN INTEGRATED DEAD FRONT AND DOOR

(71) Applicant: General Electric Company, Schenectady, NY (US)

(72) Inventors: Vu Nguyen, West Hartford, CT (US); Shyam Ramlal Mathure, Andhra Pradesh (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 121 days.

(21) Appl. No.: 14/208,272

(22) Filed: Mar. 13, 2014

(65) Prior Publication Data

US 2015/0263492 A1 Sep. 17, 2015

(51) Int. Cl.

| | |
|---|---|
| *H05K 5/02* | (2006.01) |
| *H02B 1/46* | (2006.01) |
| *H02B 1/38* | (2006.01) |
| *H02B 1/056* | (2006.01) |
| *H02B 1/40* | (2006.01) |

(52) U.S. Cl.
CPC .................. *H02B 1/46* (2013.01); *H02B 1/056* (2013.01); *H02B 1/38* (2013.01); *H02B 1/40* (2013.01)

(58) Field of Classification Search
CPC ..................................... H02B 1/38; H02B 1/40
USPC ........................................................ 361/644
See application file for complete search history.

(56) References Cited

U.S. PATENT DOCUMENTS

| | | | | |
|---|---|---|---|---|
| 2,103,072 | A | | 12/1937 | Frank |
| 4,720,769 | A | * | 1/1988 | Raabe ....................... H02B 1/42 361/634 |
| 5,081,560 | A | * | 1/1992 | Donnerstag ............... H02B 1/40 361/627 |
| 5,134,543 | A | * | 7/1992 | Sharp ....................... H02B 1/40 361/644 |
| 6,313,980 | B1 | | 11/2001 | Craft et al. |
| 6,748,711 | B2 | | 6/2004 | Hartel |
| 7,049,516 | B1 | * | 5/2006 | Haag ....................... H02B 1/38 174/481 |
| 7,209,343 | B2 | * | 4/2007 | Remmert ................ H02B 1/056 361/634 |

(Continued)

OTHER PUBLICATIONS

Ge, "A-Series II Panelboard", retrived Jan. 27, 2014, pp. 1-2, retrieved from the Internet http://www.geindustrial.com/products/panelboards/series-ii-panelboard?REQUEST=PRODUCTS&pnlid=3&famid=26&catid=73&id=pb-a.
N.A., "Panelboards", Aug. 23, 2011, pp. 1-7, retrieved from the Internet http://www.eaton.in/ecm/idcplg? IdcService=GET_FILE&allowInterrupt=1&RevisionSelectionMethod=LatestReleased&Rendition=Primary&dDocName= 16470.
Eaton, "Panelboards and Lighting Control", Commercial Distribution, vol. 2, Jun. 2012, pp. 1-143.
Square D, "Dust-Tight UL Type 12 Door-In-Door: Panelboard Enclosure", Product News, Mar. 1992, pp. 1-4.

*Primary Examiner* — Hung V Ngo
(74) *Attorney, Agent, or Firm* — GE Global Patent Operation; Stephen G. Midgley

(57) ABSTRACT

An electrical enclosure includes a rear wall, a first side wall, a second side wall, a third side wall and a fourth side wall that define an interior portion for receiving electrical devices. The electrical enclosure further includes a plurality of mounting members mounted to, and projecting outwardly from, the rear wall, and a dead front operatively connected to the plurality of mounting members. The dead front includes a surface having at least one opening receptive of an electrical device and a door pivotally mounted relative to the surface. A trim member is operatively connected to the first and second side walls. The trim member includes first, second, third and fourth sides, and a central opening configured and disposed to enable the door to transition between an open position and a closed position.

10 Claims, 6 Drawing Sheets

(56) References Cited

U.S. PATENT DOCUMENTS

| | | |
|---|---|---|
| 8,134,828 B2 | 3/2012 | Creighton et al. |
| 8,830,657 B2 * | 9/2014 | Myers ............... H02G 3/125 361/633 |
| 8,953,306 B2 * | 2/2015 | Wheeler ............ H02B 1/20 174/149 B |
| 9,007,745 B1 * | 4/2015 | Flegel ............... H02B 1/16 361/627 |
| 2010/0046147 A1 * | 2/2010 | Ranta ............... H02B 1/056 361/644 |
| 2013/0219828 A1 | 8/2013 | Canaday et al. |

\* cited by examiner

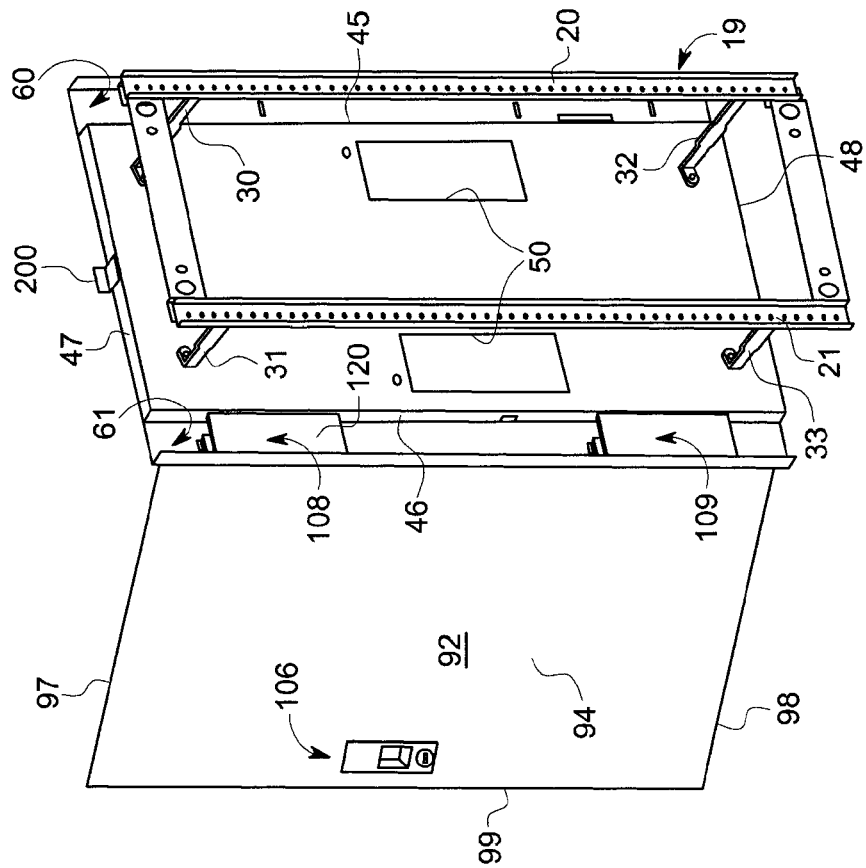
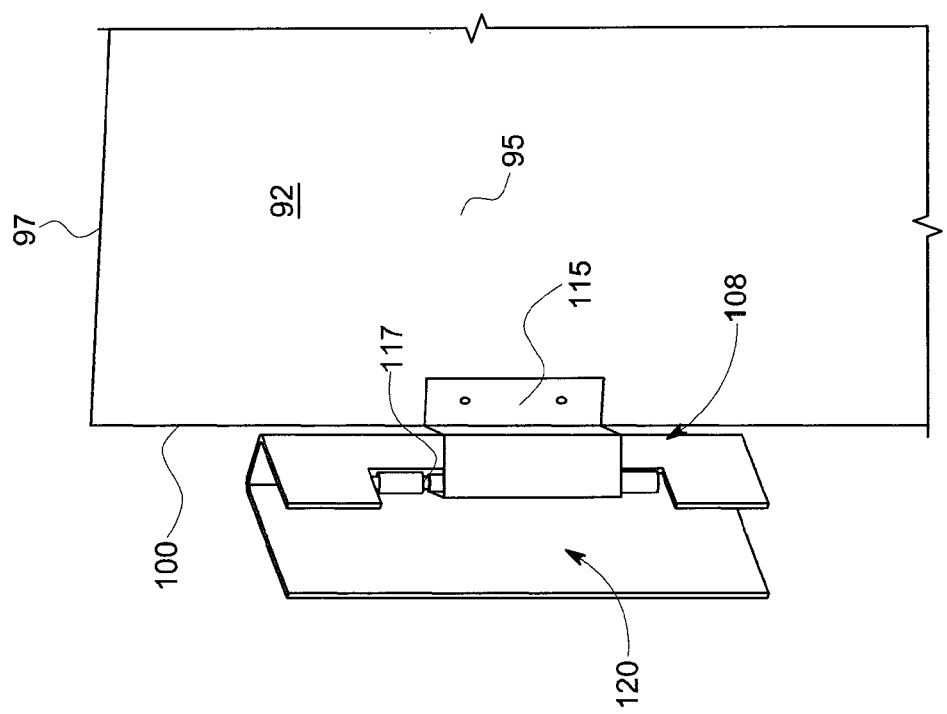
FIG. 6
FIG. 5

ELECTRICAL ENCLOSURE INCLUDING AN INTEGRATED DEAD FRONT AND DOOR

BACKGROUND OF THE INVENTION

The subject matter disclosed herein relates to the art of electrical enclosures and, more particularly, to an electrical enclosure including an integrated dead front and door.

Circuit breakers, controls, and other electrical devices are often mounted in an enclosure that limits access to exposed electrical connections. An enclosure includes a rear wall, and side walls. An interior or device support frame assembly is mounted to the rear wall. An electrical device support bracket is mounted to the interior or frame assembly. A ground bar and a neutral bar are also provided in the enclosure. Electrical devices, such as circuit breakers are mounted to the electrical device support bracket. Conductors are passed into the enclosure though knock-outs or openings formed in one or more of the rear wall and side walls. Some of the conductors are electrically connected to the electrical device(s) while others of the conductors are connected to the ground bar and/or neutral bar.

After making the connections, a dead front is installed over the electrical devices. The dead front includes openings that provide access to portions of the electrical devices such as toggles, buttons and the like. A cover including a door is then mounted to the enclosure. The dead front allows access to the portions of the electrical devices while preventing access to the conductors while the door is open.

BRIEF DESCRIPTION OF THE INVENTION

According to one aspect of an exemplary embodiment, an electrical enclosure includes a rear wall, a first side wall, a second side wall, a third side wall and a fourth side wall that define an interior portion for receiving electrical devices. The electrical enclosure further includes a plurality of mounting members mounted to, and projecting outwardly from, the rear wall, and a dead front operatively connected to the plurality of mounting members. The dead front defining a surface having at least one opening receptive of an electrical device and a door pivotally mounted relative to the surface. A trim member is operatively connected to the first and second side walls. The trim member includes a surface having first, second, third and fourth sides, and a central opening that is configured and disposed to enable the door to transition between an open position and a closed position.

According to another aspect of an exemplary embodiment, an electrical enclosure includes a rear wall, a first side wall, a second side wall, a third side wall and a fourth side wall that define an interior portion housing one or more circuit breakers. The electrical enclosure further includes a plurality of mounting members mounted to, and projecting outwardly from, the rear wall, and a dead front operatively connected to the plurality of mounting members. The dead front defining a surface including at least one opening receptive of the one or more circuit breakers, and a door pivotally mounted relative to the surface. A trim member is operatively connected to the first and second side walls. The trim member including first, second, third and fourth sides, and a central opening configured and disposed to enable the door to transition between an open position and a closed position.

According to yet another aspect of an exemplary embodiment, a method of assembling an electrical enclosure having a rear wall and a plurality of side walls that define an interior portion including at least one electrical device includes positioning an opening on a dead front having including a door and a peripheral edge about the at least one electrical device, mounting the dead front to the rear wall, covering a gap between the peripheral edge of the dead front and the plurality of side walls with a trim member having a central opening, and pivoting the door between an open position and a closed position through the central opening.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a partial perspective view of the door;

FIG. 6 is a rear view of the dead front connected to a plurality of mounting members, in accordance with an aspect of an exemplary embodiment.

The detailed description explains embodiments of the invention, together with advantages and features, by way of example with reference to the drawings.

DETAILED DESCRIPTION OF THE INVENTION

Figure 1:
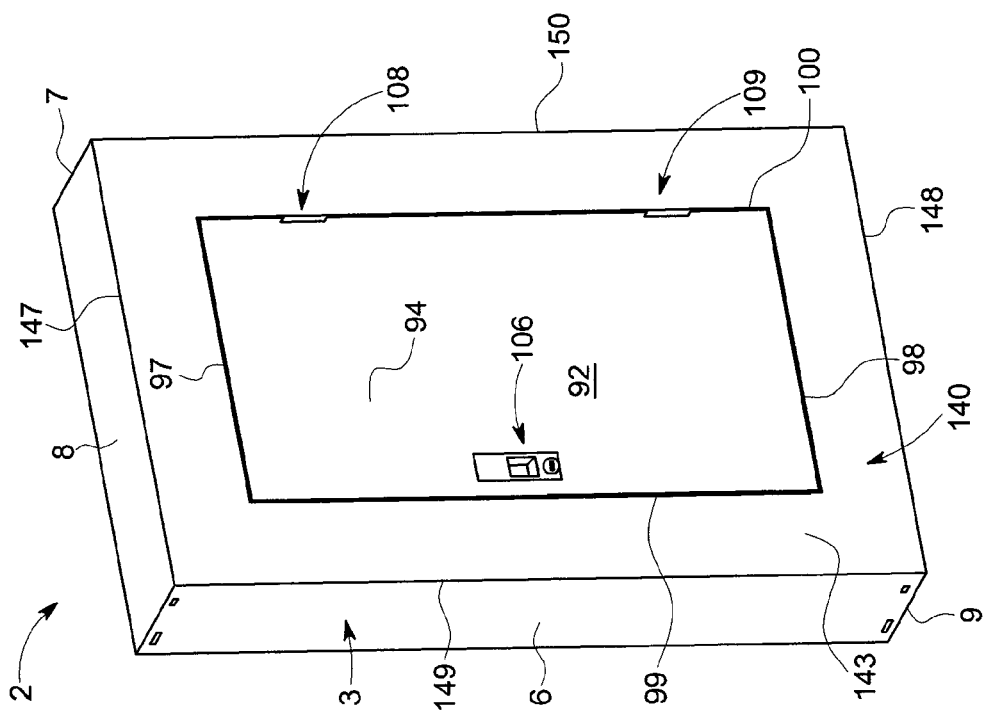
FIG. 1 is a perspective view of an electrical enclosure having an integrated dead front and door, in accordance with an exemplary embodiment shown with the door in a closed configuration.
Figure 2:
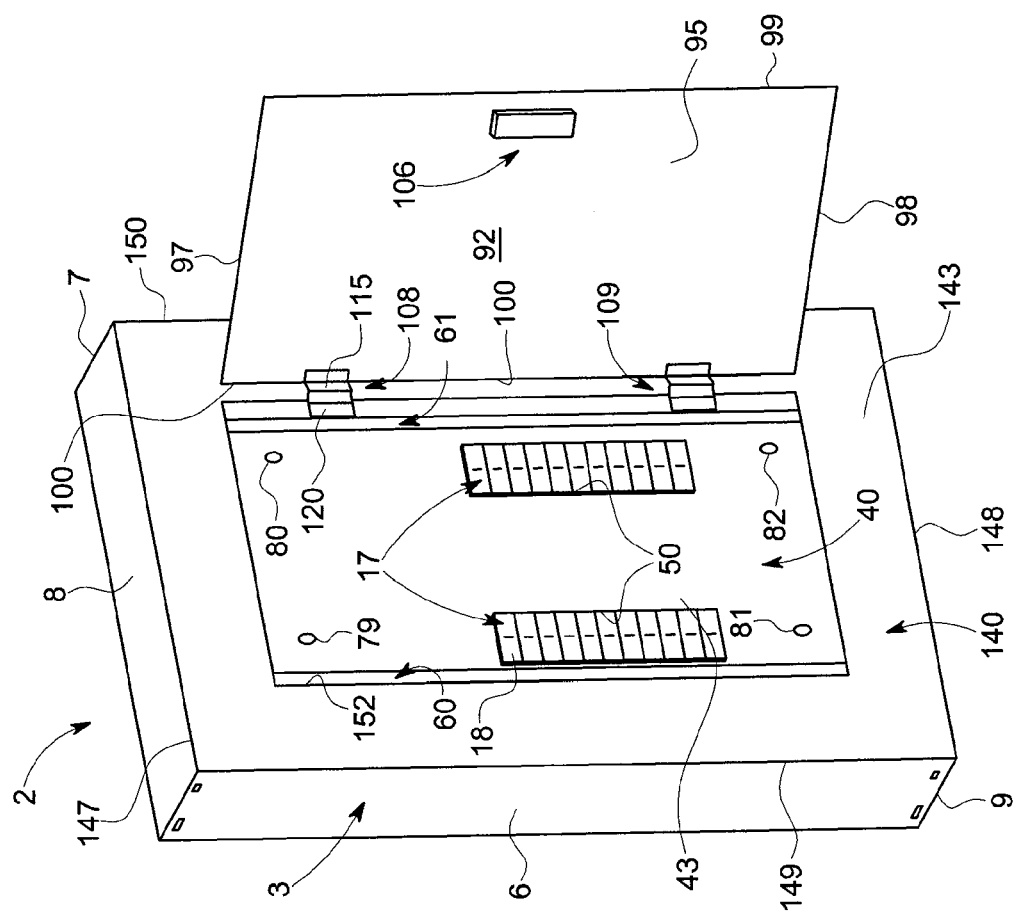
FIG. 2 is a perspective view of an electrical enclosure having an integrated dead front and door, in accordance with an exemplary embodiment shown with the door in an open configuration.
Figure 3:
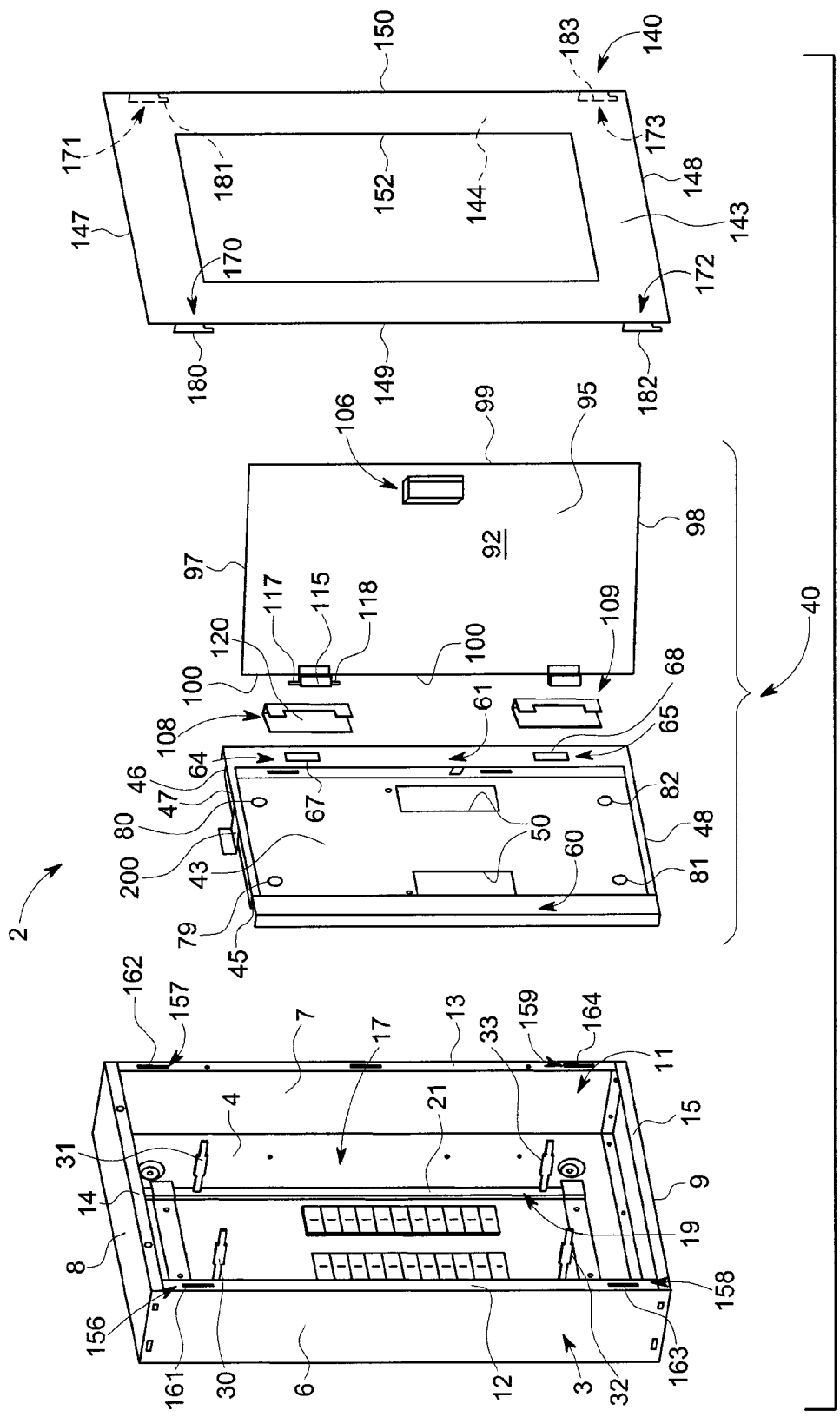
FIG. 3 is an exploded view of the electrical enclosure, in accordance with an exemplary embodiment.

An electrical enclosure, in accordance with an exemplary embodiment, is illustrated generally at 2, in FIG. 1. As shown in FIGS. 1-3, electrical enclosure 2 includes a housing 3 having a rear wall 4, a first side wall 6, a second, opposing side wall 7, a third side wall 8 and a fourth, opposing side wall 9 that collectively define an interior portion 11. First side wall 6 includes a first inwardly extending flange 12, second side wall 7 includes a second inwardly extending flange 13, third side wall 8 includes a third inwardly extending flange 14, and fourth side wall 9 includes a fourth inwardly extending flange 15. Interior portion 11 houses electrical devices 17, shown in the form of circuit breakers, one of which is indicated at 18. Electrical devices 17 are supported by an electrical device support system 19 having a first support rail 20 (FIG. 6) and a second support rail 21. Electrical device support system 19 may also include one or more bus bars (not shown) that supply electrical power to circuit breakers 18. First and second support rails 20 and 21 also provide support for a first mounting member 30, a second mounting member 31, a third mounting member 32 and a fourth mounting member 33. Mounting members 30-33 provide an attachment point for a dead front 40 in accordance with an exemplary embodiment. At this point it should be understood that the term "dead front" refers to a member that covers exposed electrically conductive portions in the electrical enclosure while at the same time providing access to operational portions of electrical components, such as circuit breaker switch members that may be toggled to electrically connect and interrupt current flow in an electrical circuit.

Figure 4:
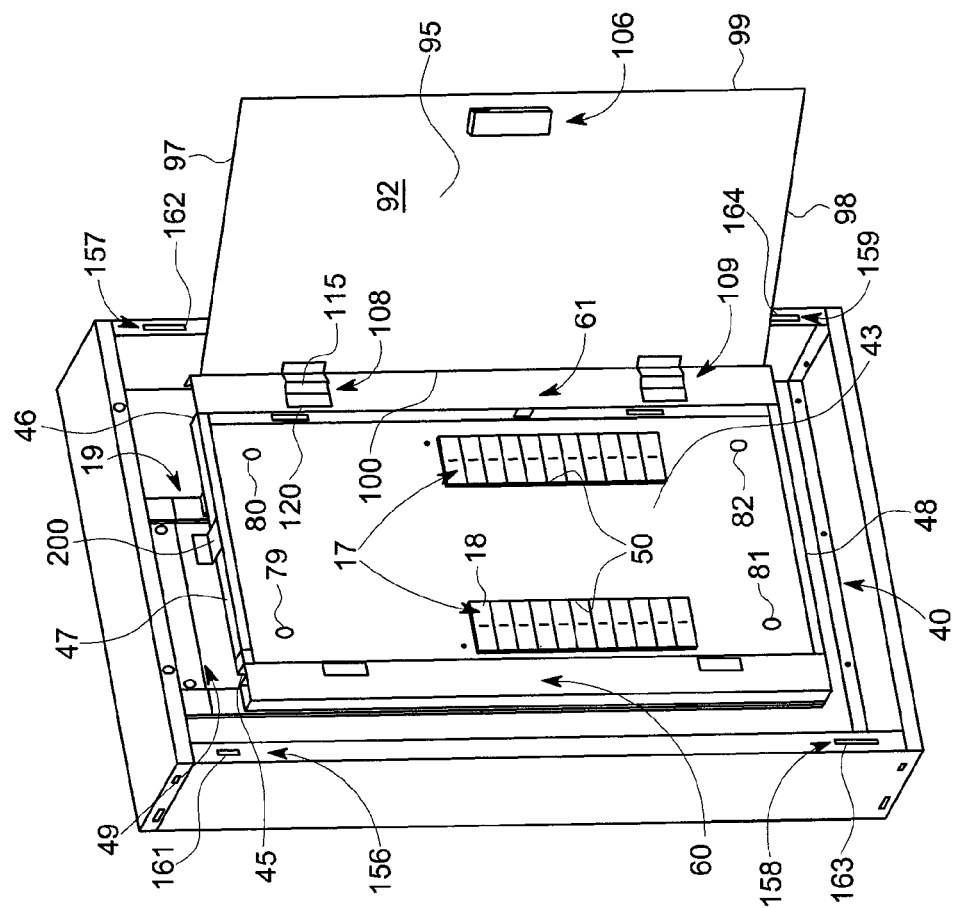
FIG. 4 is a perspective view of the electrical enclosure of FIG. 2 shown without an installed trim member.

As shown in FIGS. 3 and 4, dead front 40 includes a surface 43 defined by a first side 45, a second side 46, a third side 47, and a fourth side 48. When installed into housing 3, first, second, third, and fourth sides 45-48 are spaced from corresponding ones of first, second, third and fourth side walls 6-9 forming a peripheral gap 49. Surface 43 includes openings 50 that receive one or more circuit breakers 18. Specifically, when installed, a portion of each circuit breaker 18 may extend through a corresponding opening 50. First side 45 includes a first flange element 60 and second side 46 includes a second flange element 61. In the exemplary embodiment shown, second flange element 61 includes a first opening 64 and a second opening 65. As will become more readily apparent below, first opening 64 defines a first hinge receiving member 67 and second opening 65 defines a second hinge receiving member 68. At this point it should be understood that first flange element 60 may also include first and second hinge receiving members which may be covered by a knockout element (not separately labeled). Surface 43 also includes a plurality of holes 79-82 that register with openings (not separately labeled) on mounting members 30-33. Holes 79-82 receive mechanical fasteners (also not separately labeled) that retain dead front 40 to mounting members 30-33.

In further accordance with an exemplary embodiment, dead front 40 includes a door 92 pivotally mounted to second flange element 61. Door 92 includes a first or outer surface 94 and a second or inner surface 95 defined by a first side edge 97, a second side edge 98, a third side edge 99, and a fourth side edge 100. Door 92 includes a latch 106 that may engage with first flange element 60. In the exemplary embodiment shown, door 92 includes a first hinge assembly 108 and a second hinge assembly 109. As each hinge assembly 108 and 109 is substantially similar, a detailed description will be made to hinge assembly 108 with an understanding that hinge assembly 109 includes similar structure. As best shown in FIG. 5, hinge assembly 108 includes a fixed element 115 mounted to door 92 along fourth side edge 100. Fixed element 115 includes a first pin 117 and a second pin 118. A pivoting element 120 is coupled to fixed element 115 through first and second pins 117 and 118. Pivoting element 120 is received by first hinge receiving member 67 provided on dead front 40. In this manner, door 92 is pivotally mounted to dead front 40 between a closed position, as shown in FIG. 1, and an open position, as shown in FIG. 2.

Figure 7:
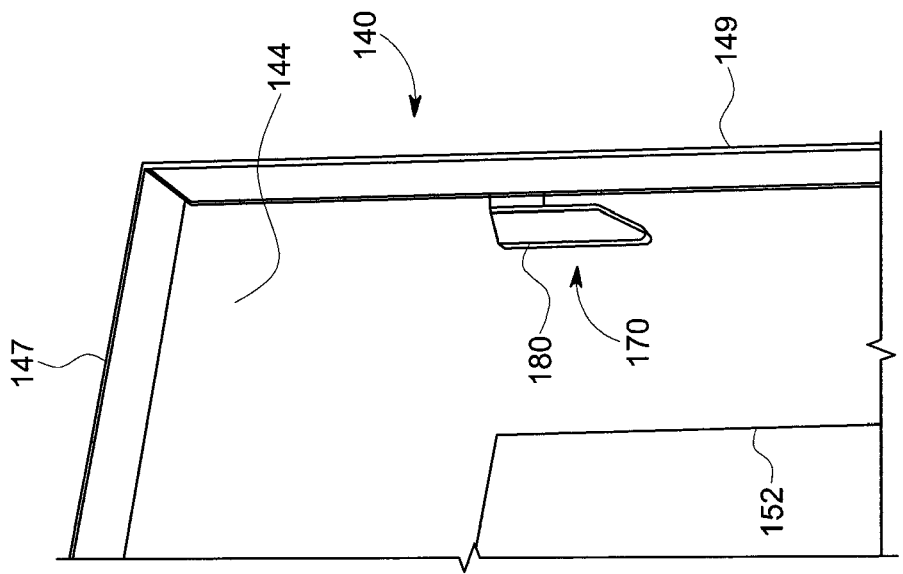
FIG. 7 is a partial perspective view of the trim member, in accordance with an exemplary embodiment.

In still further accordance with an exemplary embodiment, electrical enclosure 2 includes a trim member 140 having a first or outer surface 143 and a second or inner surface 144 (FIG. 7) defined by a first side 147, a second side 148, a third side 149, and a fourth side 150. Trim member 140 covers peripheral gap 49 when installed to electrical enclosure 2, as will be described more fully below. Trim member 140 includes a central opening 152 that extends about door 92 when mounted to housing 3. Central opening 152 allows freedom of movement of door 92 between the closed configuration and the open configuration without exposing peripheral gap 49.

In accordance with an aspect of an exemplary embodiment, housing 3 includes a first mounting member 156, a second mounting member 157, a third mounting member 158, and a fourth mounting member 159. First mounting member 156 takes the form of a first slot 161 formed in first flange 12, second mounting member 157 takes the form of a second slot 162 formed in second flange 13. Third mounting member 158 takes the form of a third slot 163 formed in first flange 12 and fourth mounting member 159 takes the form of a fourth slot 164 formed in second flange 12. Of course, it should be understood that mounting members 156-159 may take on a variety of forms.

Trim member 140 includes a first mounting element 170, a second mounting element 171, a third mounting element 172, and a fourth mounting element 173. First mounting element 170 takes the form of a first hook 180, second mounting element 171 takes the form of a second hook 181, third mounting element 172 takes the form of a third hook 182 and fourth mounting element 173 takes the form of a fourth hook 183. Hooks 180-183 project from inner surface 144 and are configured to register with, and be received by, slots 161-164 when joining trim member 140 to housing 3. In accordance with another aspect of an exemplary embodiment, dead front 40 includes a hook element 200 that may be used to support trim member 140 prior to installation. Hook element 200 is mounted to third side 47 of peripheral gap 49.

At this point it should be understood that the exemplary embodiments describe an electrical enclosure including a trim member that may be mounted without the need for mechanical fasteners or tools. In addition, the exemplary embodiments eliminate the need for additional stiffening members that are welded to the dead front and/or trim in prior art enclosures. In this manner, the exemplary embodiment, in addition to simplifying and reducing installation time, reduces manufacturing steps, material and manufacturing costs, and manufacturing time of the electrical enclosure. Further, the hinge assemblies of the exemplary embodiment enable technicians to reverse door opening direction in the field.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electrical enclosure including a rear wall, a first side wall, a second side wall, a third side wall and a fourth side wall that define an interior portion for receiving electrical devices; the electrical enclosure comprising:
   a plurality of mounting members mounted to, and projecting outwardly from, the rear wall;
   a dead front operatively connected to the plurality of mounting members, the dead front defining a surface including at least one opening receptive to an electrical device and a door pivotally mounted relative to the surface; and
   a trim member operatively connected to the first and second side walls, the trim member including first, second, third and fourth sides, and a central opening configured and disposed to enable the door to transition between an open position and a closed position;
   a first mounting member provided on the first side wall and a second mounting member provided on the second side wall, and a first mounting element provided on the first side and a second mounting element provided on the second side, the first and second mounting members cooperating with a corresponding one of the first and second mounting elements to retain the trim member to the electrical enclosure;

wherein the first side wall includes a first flange and the second side wall includes a second flange, the first mounting member comprises a first slot formed in the first flange and the second mounting member comprises at second slot formed in the second flange;

wherein the first mounting element comprises a hook projecting from the first side and the second mounting element comprises a second hook projecting from the second side, the first hook engaging with the first slot in the first flange and the second hook engaging with the second slot in the second flange.

2. The electrical enclosure according to claim 1, further comprising: an electrical device support system mounted to the rear wall; and at least one electrical device mounted to the electrical device support system, wherein a portion of the at least one electrical device projects through the at least one opening.

3. The electrical enclosure according to claim 1, further comprising a hook element mounted to the dead front, the hook element being configured and disposed to support the trim member to the electrical enclosure prior to mounting.

4. The electrical enclosure according to claim 1, wherein the dead front includes a first side having a first flange element and a second side having a second flange element, at least one of the first and second flange elements including first and second hinge receiving members.

5. The electrical enclosure according to claim 4, wherein the door includes a first hinge assembly detachably connected to the one of the first and second flanges at the first hinge receiving member and a second hinge assembly detachably connected to the one of the first and second flanges at the second hinge receiving member.

6. An electrical enclosure including a rear wall, a first side wall, a second side wall, a third side wall and a fourth side wall that define an interior portion housing one or more circuit breakers, the electrical enclosure comprising:

a plurality of mounting members mounted to, and projecting outwardly from, the rear wall;

a dead front operatively connected to the plurality of mounting members, the dead front defining a surface including at least one opening receptive of the one or more circuit breakers and a door pivotally mounted relative to the surface; and a trim member operatively connected to the first and second side walls, the trim member including first, second, third and fourth sides, and a central opening configured and disposed to enable the door to transition between an open position and a closed position;

a first mounting member provided on the first side wall and a second mounting member provided on the second side wall, and a first mounting element provided on the first side and a second mounting element provided on the second side, the first and second mounting members cooperating with a corresponding one of the first and second mounting elements to retain the trim member to the electrical enclosure;

wherein the first side wall includes a first flange and the second side wall includes a second flange, the first mounting member comprises a first slot formed in the first flange and the second mounting member comprises at second slot formed in the second flange; and wherein the first mounting element comprises a hook projecting from the first side and the second mounting element comprises a second hook projecting from the second side, the first hook engaging with the first slot in the first flange and the second hook engaging with the second slot in the second flange.

7. The electrical enclosure according to claim 6, wherein a portion of at least one of the one or more circuit breakers projects through the at least one opening.

8. The electrical enclosure according to claim 6, further comprising a hook element mounted to the dead front, the book element being configured and disposed to support the trim member to the electrical enclosure prior to mounting.

9. The electrical enclosure according to claim 6, wherein the dead front includes a first side having a first flange element and a second side having a second flange element, at least one of the first and second flange elements including first and second hinge receiving members.

10. The electrical enclosure according to claim 9, wherein the door includes a first hinge assembly detachably connected to the one of the first and second flanges at the first hinge receiving member and a second hinge assembly detachable connected to the one of the first and second flanges at the second hinge receiving member.

* * * * *